United States Patent [19]

Edwards

[11] 4,344,184

[45] Aug. 10, 1982

[54] WIRELESS MICROPHONE

[75] Inventor: Robert R. Edwards, Los Alamitos, Calif.

[73] Assignee: Cetec Corporation, El Monte, Calif.

[21] Appl. No.: 174,153

[22] Filed: Jul. 31, 1980

[51] Int. Cl.³ .......................... H04B 1/034; H04B 1/04
[52] U.S. Cl. ...................................... 455/95; 343/702; 455/127; 455/128
[58] Field of Search ...................... 455/89, 90, 95, 100, 455/128, 129, 127; 343/702

[56] References Cited

U.S. PATENT DOCUMENTS 2,828,413  3/1958  Bowers ................................ 455/128
3,564,416  2/1971  Price ..................................... 455/95

Primary Examiner—Marc E. Bookbinder

[57] ABSTRACT

A wireless microphone which does not require a separate antenna. A wireless microphone in the form of an elongate housing of nonelectrical conducting material with a microphone unit mounted in one end of the housing and a battery and control switch mounted in the other end of the housing. A first electrical circuit including an audio amplifier and a second electrical circuit including a radio frequency amplifier are mounted in the housing physically separated from each other and interconnected by radio frequency chokes. The output of the radio frequency amplifier is connected to circuit ground of the audio amplifier, with the microphone unit and first circuit serving as one radiator of a dipole and with the battery and second circuit serving as the other radiator of the dipole.

10 Claims, 4 Drawing Figures

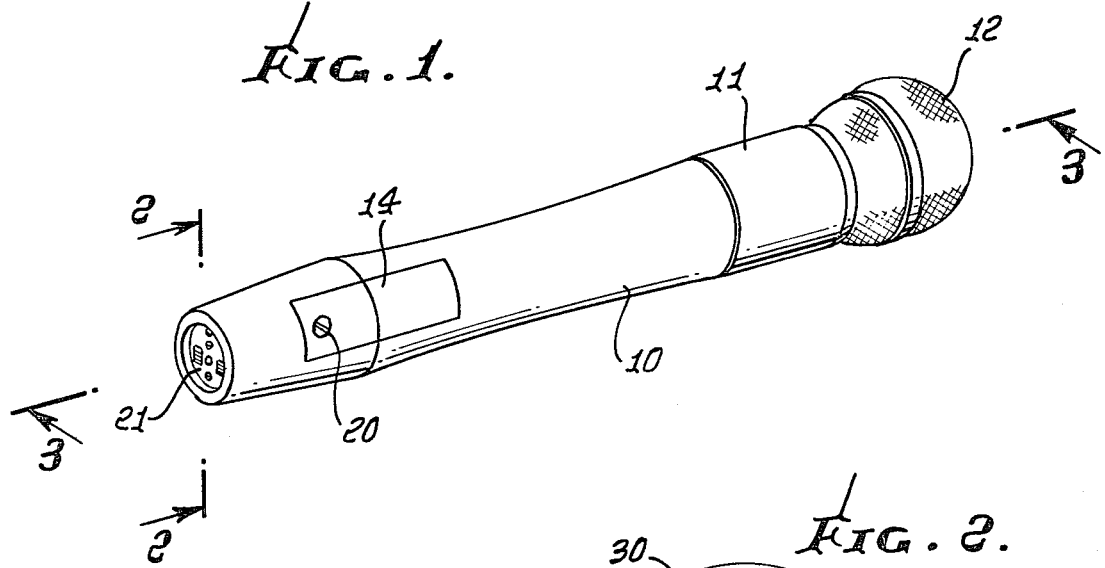
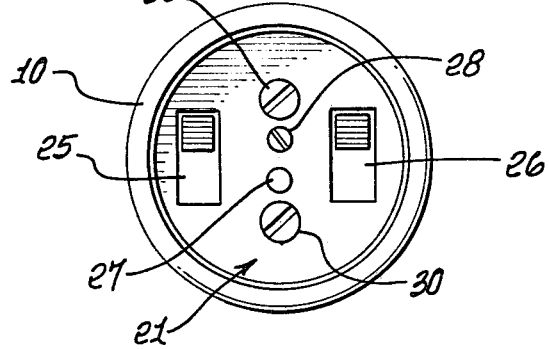
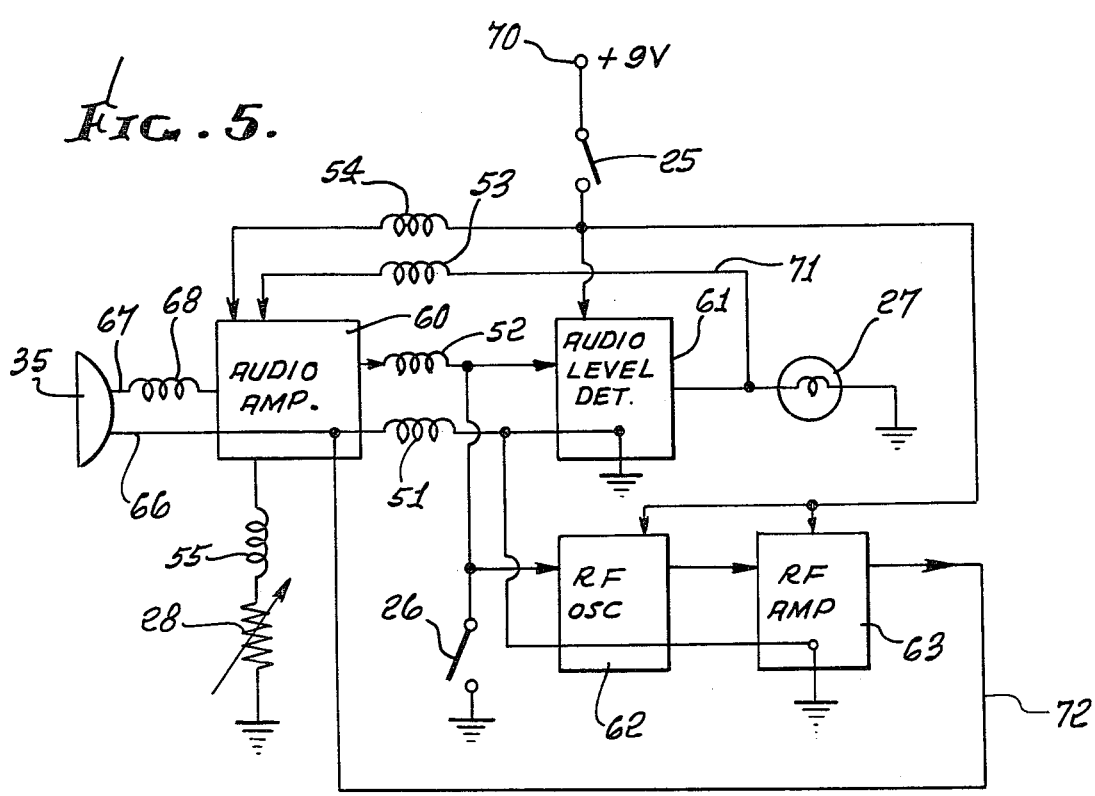

WIRELESS MICROPHONE

BACKGROUND OF THE INVENTION

This invention relates to wireless microphones of the type used by singers during stage performances.

The conventional wireless microphone is a generally cylindrical device with the microphone or sound pickup unit mounted at one end within a protective wire screen. An audio amplifier and a radio frequency amplifier are mounted within the body along with associated power supply and control devices. An antenna is mounted at the end of the device opposite the microphone unit. Several types of antenna constructions have been utilized in the past, but all provide for some type of antenna projecting from the hand held microphone. In one prior art unit, a metal tube is mounted at the end of the housing, with the tube the same diameter as the housing, typically about 1¼ inches diameter and 3 inches long. In another conventional design, the antenna is in the form of a rod or small tube projecting from the end of the housing, typically about ½ inch diameter and 4 inches long. A third presently used design has a wire antenna projecting from the housing in the order of ⅛ inch diameter and 6 inches long.

All of these prior art constructions are considered unsightly and the projecting antenna makes the overall unit relatively large and hence more difficult to utilize.

Accordingly it is an object of the present invention to provide a new and improved wireless microphone design which does not utilize any separate projecting antenna structure. A further object of the invention is to provide such a wireless microphone with the internal structure of the unit itself serving as a dipole radiator.

Other objects, advantages, features and results will more fully appear in the course of the following description.

SUMMARY OF THE INVENTION

A wireless microphone having an elongate housing of nonelectrical conducting material with a microphone unit mounted in one end of the housing. A first electrical circuit including the audio amplifier and a second electrical circuit including the radio frequency amplifier are mounted in the housing physically separate from each other, with the first and second circuits interconnected by radio frequency chokes and with the output of the radio frequency amplifier connected to the audio amplifier, as at the audio amplifier circuit ground. In the preferred embodiment, the battery and control devices are mounted at the opposite end of the housing, with the battery and second circuit containing the radio frequency amplifier functioning as one element of the dipole and with the first circuit with the audio amplifier and the microphone unit with the protective screen serving as the other element of the dipole. Preferably, the amplifier circuits are mounted on a common printed circuit board with the first and second circuits spaced from each other with the gap between the circuits bridged by the radio frequency chokes.

BRIEF DESCRIPTION OF THE DRAWINGS

FIG. 1 is a perspective view of a wireless microphone incorporating a presently preferred embodiment of the invention;

FIG. 2 is an end view of the microphone of FIG. 1 showing the control devices;

FIG. 5 is an electrical diagram of the wireless microphone of FIG. 1.

DESCRIPTION OF THE PREFERRED EMBODIMENTS

The wireless microphone as shown in FIG. 1 includes a housing 10, a collar 11, and a wire screen 12. The housing 10 is made of electrical nonconducting material and typically, is a plastic molding. A removable cover 14 provides access to the interior of the housing for inserting and removing a battery which provides the electrical power for operation of the microphone.

Figure 3:
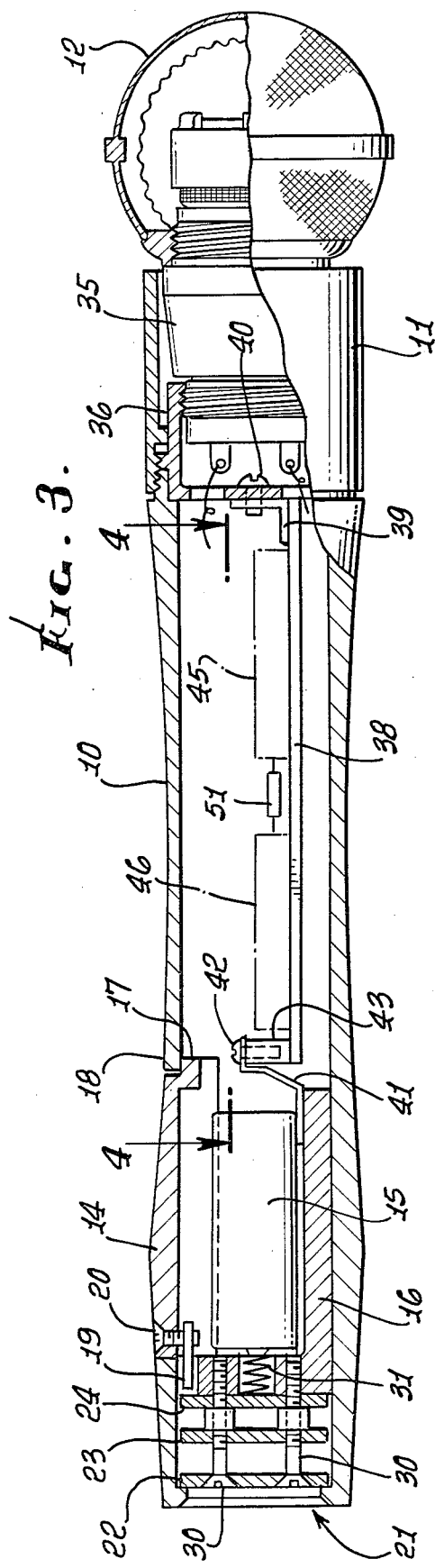
FIG. 3 is an enlarged sectional view taken along the line 3—3 of FIG. 1.

Referring to FIG. 3, a battery 15 is held in place on a plate 16 by means of the cover 14. The cover has a lip 17 which is positionable under a portion 18 of the housing, and a latch 19 operated by a screw 20 holding the cover in place. A block of foam plastic or other resilient material may be positioned between the cover and the battery to hold the battery in position.

A control assembly 21 is mounted in the lower end of the housing 10, which is the left end as viewed in FIGS. 1 and 3. Typically the control assembly comprises three plastic discs 22, 23, 24, which carry a power on-off switch 25 and a microphone on-off switch 26, along with a microphone overload indicator light 27 and a gain adjustment potentiometer 28. A slotted screwhead of the potentiometer 28 is accessable from the lower end of the microphone, as shown in FIG. 2. The discs 22, 23, 24 are joined together and attached to the plate 16 by screws 30. Spring contacts 31 are included in the control assembly for making electrical contact with the terminals of the battery 15.

A conventional microphone unit 35 is threaded into a sleeve 36 which in turn is attached to the housing 10 by the collar 11. The metal screen 12 is threaded onto the microphone unit 35 to provide mechanical protection for the microphone unit.

A printed circuit board 38 is attached to the sleeve 36 by means of a bracket 39 and screw 40. At its other end, the printed circuit board 38 is connected to the plate 16 by another bracket 41, screw 42 and post 43.

Figure 4:
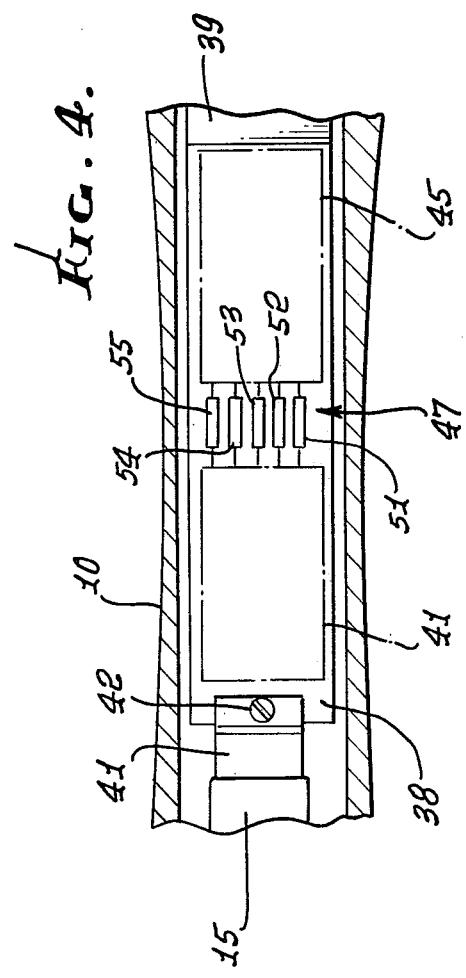
FIG. 4 is a top view of the printed circuit board of FIG. 3.

The printed circuit board 38 is conventional in construction and includes a first electrical circuit 45 adjacent one end and a second electrical circuit 46 adjacent the other end, with a gap between the circuits 45, 46 generally indicated at 47. The individual components of the circuits 45, 46 are not shown in FIGS. 3 and 4, but a block diagram of the circuits is set out in FIG. 5. Interconnections between the circuits 45, 46 are provided by a plurality of radio frequency chokes 51-55 and one additional connection to be described. Otherwise the components and interconnections of the circuits 45 and 46 are arranged so that the two circuits are physically separated from each other.

Referring now to FIG. 5 the electrical circuit includes the microphone unit 35, an audio amplifier 60, an audio level detector 61, a radio frequency oscillator 62, and a radio frequency amplifier 63.

As previously indicated, the microphone unit 35 may be conventional and has one output conductor 66 connected to circuit ground of the audio amplifier and another output conductor 67 connected to the input of the audio amplifier through a conventional choke 68. The circuit ground conductor 66 of the audio amplifier is connected to circuit ground of the remainder of the system through the radio frequency choke 51. The output from the audio amplifier is connected as an input to the audio level detector 61 through another radio frequency choke 52. Power for operating this system is provided at terminal 70 and controlled by switch 25, with power connected to the audio amplifier through radio frequency choke 54. Feedback may be provided from the audio level detector on conductor 71 to the audio amplifier through the radio frequency choke 53 to provide a control for the level of the output from the audio amplifier. The lamp 27 is illuminated when the audio output is above a predetermined level, indicating to the performer that the microphone is being overloaded.

The output from the audio amplifier is also connected as an input to the radio frequency oscillator to modulate the oscillator output, which in turn is amplified in the radio frequency amplifier. The output from the radio frequency amplifier is connected via conductor 72 to the circuit ground conductor 66 of the audio amplifier. Switch 26, the microphone on-off switch, provides for grounding the input to the radio frequency stage when the microphone is to be turned off. The variable resistor 28 is utilized to control the gain of the audio amplifier and is connected into the audio amplifier circuit through the radio frequency choke 55.

In the embodiment illustrated, the audio amplifier 60 corresponds to the first electrical circuit 45, and the audio level detector 61, the radio frequency oscillator 62 and the radio frequency amplifier 63 correspond to the second electrical circuit 46. The only connection between the circuits except for the five chokes 51–55, is the conductor 72 which connects the radio frequency amplifier output to the circuit ground of the audio amplifier. With this physical configuration, the electrical conducting components of the overall microphone function as a dipole radiator or an antenna, so that no separate antenna is required.

One pole or radiator of the dipole is formed by the first electrical circuit 45 along with the metal components in the microphone unit, the protective screen 12, and the collar 11 and sleeve 36 if made of metal. The other pole or radiator of the dipole is formed by the components of the electrical circuit 46, the battery 15, and the conductors and metal components in the control unit 21. Normally, a printed circuit board will have a minimum amount of conductive material deposited thereon to provide the desired interconnections between components. In the wireless microphone, additional metal can be obtained by utilizing the normally uncovered portions of the printed circuit board, covering these portions with the conducting material which is connected to the respective grounds. However, there should be a gap between the printed circuit board conductors associated with the circuit 45 and those associated with the circuit 46, with the gap bridged only by the radio frequency chokes and the interconnection between the radio frequency amplifier and the audio amplifier.

While the preferred circuit illustrated herein utilizes the audio level detector, the feedback connection, the gain control adjustment, and power and microphone switches, it is readily understood that this specific circuit is not essential and that variations of the circuitry can be utilized. The significant feature is the separation of the circuitry into two sections with interconnections by means of the radio frequency chokes.

I claim:
1. In a wireless microphone, the combination of:
   an elongated housing of electrically nonconducting material;
   a microphone unit mounted in one end of said housing;
   a first electrical circuit including an audio amplifier;
   a second electrical circuit including a radio frequency amplifier;
   a plurality of radio frequency chokes interconnecting said first and second electrical circuits;
   a conductor connecting the output of said radio frequency amplifier to said audio amplifier; and
   means for mounting said first and second circuits in said housing spaced from each other with said chokes positioned in the space between said circuits, with said first circuit mounted intermediate said microphone unit and said second circuit, with the electrical components of said first circuit comprising at least part of one radiator of a dipole and the electrical components of said second circuit comprising at least part of the other radiator of said dipole.

2. A wireless microphone as defined in claim 1 wherein said audio amplifier has a first circuit ground, and said radio frequency amplifier output is connected to said first circuit ground.

3. A wireless microphone as defined in claim 1 wherein said first and second circuits are formed on a printed circuit board mounted within said housing, with said circuits separated axially on said board by a gap, and with said radio frequency chokes positioned in said gap between said first and second circuits.

4. A microphone unit as defined in claim 3 with a battery and an on-off switch mounted at another end of said housing and connected to said second circuit, and wherein said microphone unit includes a protective screen and said audio amplifier has a first circuit ground, with said screen connected to said first circuit ground.

5. In a wireless microphone, the combination of:
   an elongated housing of electrically nonconducting material;
   a microphone unit mounted in one end of said housing;
   a first electrical circuit including an audio amplifier having a first circuit ground;
   a second electrical circuit including a radio frequency amplifier having a second circuit ground;
   a plurality of radio frequenty chokes interconnecting said first and second electrical circuits,
   said plurality of chokes including a first choke connected between said first and second grounds and a second choke connected between said first circuit output and said second circuit input;
   a conductor connecting the output of said radio frequency amplifier to said first circuit ground of said audio amplifier; and
   means for mounting said first and second circuits in said housing with said first circuit mounted intermediate said microphone unit and said second circuit, with said first circuit comprising at least part of one radiator of a dipole and said second circuit comprising at least part of the other radiator of said dipole.

6. A wireless microphone as defined in claim 5 including a feedback connection from said second circuit to said first circuit, and wherein said plurality of chokes includes a third choke in said feedback connection.

7. A wireless microphone as defined in claim 6 including a battery power supply mounted in said housing, and
wherein said plurality of chokes includes a fourth choke connected between said battery and said first circuit.

8. A wireless microphone as defined in claim 7 including a gain control resistor, and
wherein said plurality of chokes includes a fifth choke connected between said gain control resistor and said first circuit.

9. In a wireless microphone, the combination of:
an elongated housing of electrically nonconducting material;
a microphone unit mounted in one end of said housing;
a first electrical circuit including an audio amplifier;
a second electrical circuit including a radio frequency amplifier;
a plurality of radio frequency chokes interconnecting said first and second electrical circuits;
a conductor connecting the output of said radio frequency amplifier to said audio amplifier;
means for mounting said first and second circuits in said housing with said first circuit mounted intermediate said microphone unit and said second circuit; and
a battery mounted in another end of said housing and connected to said second circuit by an off-on switch and connected to said first circuit through one of said radio frequency chokes;
said microphone unit and first circuit comprising at least part of one radiator of a dipole and said battery and second circuit comprising at least part of other radiator of said dipole.

10. In a wireless microphone, the combination of:
an elongated housing of electrically nonconducting material;
a microphone unit mounted in one end of said housing;
a first electrical circuit including an audio amplifier;
a second electrical circuit including a radio frequency amplifier;
a plurality of radio frequency chokes interconnecting said first and second electrical circuits;
a conductor connecting the output of said radio frequency amplifier to said audio amplifier;
means for mounting said first and second circuits in said housing with said first circuit mounted intermediate said microphone unit and said second circuit, with said first circuit comprising at least part of one radiator of a dipole and said second circuit comprising at least part of the other radiator of said dipole;
said first and second circuits formed on a printed circuit board mounted within said housing, with said circuits separated axially on said board by a gap, and with said radio frequency chokes positioned in said gap; and
a battery and an on-off switch mounted at another end of said housing and connected to said second circuit;
said microphone unit including a protective screen and said audio amplifier having a first circuit ground, with said screen connected to said first circuit ground.

* * * * *